(12) United States Patent
Zander

(10) Patent No.: US 8,228,024 B1
(45) Date of Patent: Jul. 24, 2012

(54) BATTERY-MAGAZINE

(76) Inventor: Christopher Zander, Las Vegas, NV (US)

( * ) Notice: Subject to any disclaimer, the term of this patent is extended or adjusted under 35 U.S.C. 154(b) by 317 days.

(21) Appl. No.: 12/700,697

(22) Filed: Feb. 4, 2010

Related U.S. Application Data

(60) Provisional application No. 61/149,971, filed on Feb. 4, 2009.

(51) Int. Cl.
*H02J 7/00* (2006.01)
*H01M 12/00* (2006.01)
*H01M 2/10* (2006.01)

(52) U.S. Cl. ............. 320/107; 320/110; 429/9; 429/97; 429/155; 429/157

(58) Field of Classification Search .................. 320/107, 320/110; 429/9, 97, 155, 157
See application file for complete search history.

(56) References Cited

U.S. PATENT DOCUMENTS

| | | | | |
|---|---|---|---|---|
| 5,526,600 | A * | 6/1996 | Chesnut et al. | 42/50 |
| 5,700,075 | A * | 12/1997 | Perone | 312/45 |
| 2005/0020126 | A1* | 1/2005 | Shinohara et al. | 439/515 |
| 2006/0076366 | A1* | 4/2006 | Furner et al. | 222/402.13 |
| 2006/0199067 | A1* | 9/2006 | Barbir et al. | 429/37 |
| 2009/0258284 | A1* | 10/2009 | Okita et al. | 429/96 |

* cited by examiner

*Primary Examiner* — M'Baye Diao

(57) ABSTRACT

A battery container is presented which provides multiple configurations that allow the storage of cylindrical or rectangular batteries in a magazine and ensures the maintenance of a consistent orientation, easy access, and physical protection of the batteries. The battery container is further adaptable to provide easy recharging of the batteries. The battery container is additionally configurable to be connectable with other battery containers, allowing the easy storage and distinguishability of charged and discharged batteries. The convenient storage for discharged batteries increases the likelihood that more batteries will be retained for proper disposal, rather than being discarded on the ground or in an improper location.

27 Claims, 8 Drawing Sheets

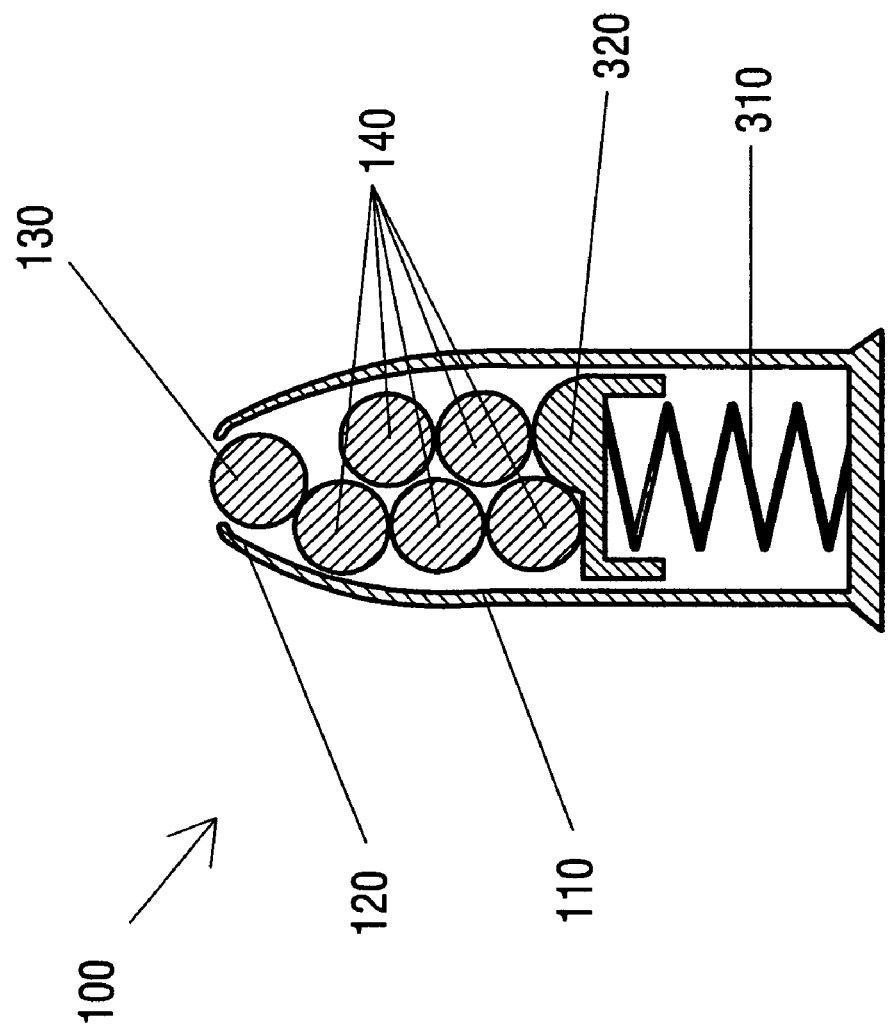

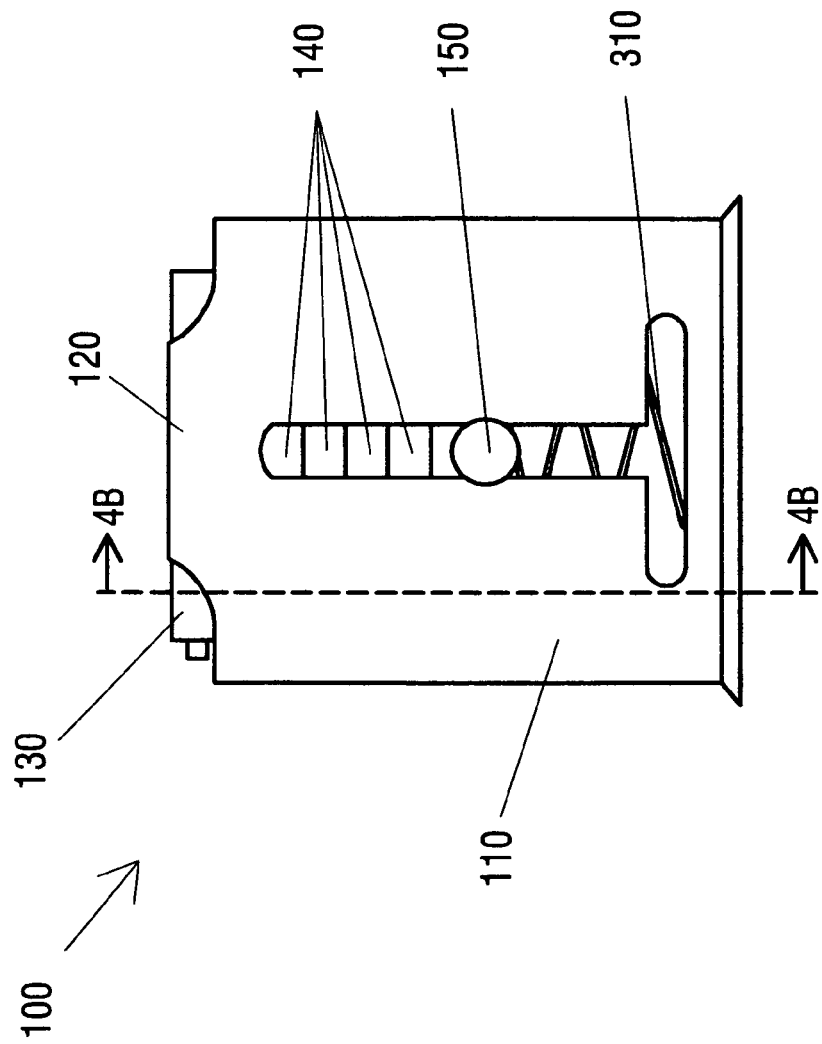

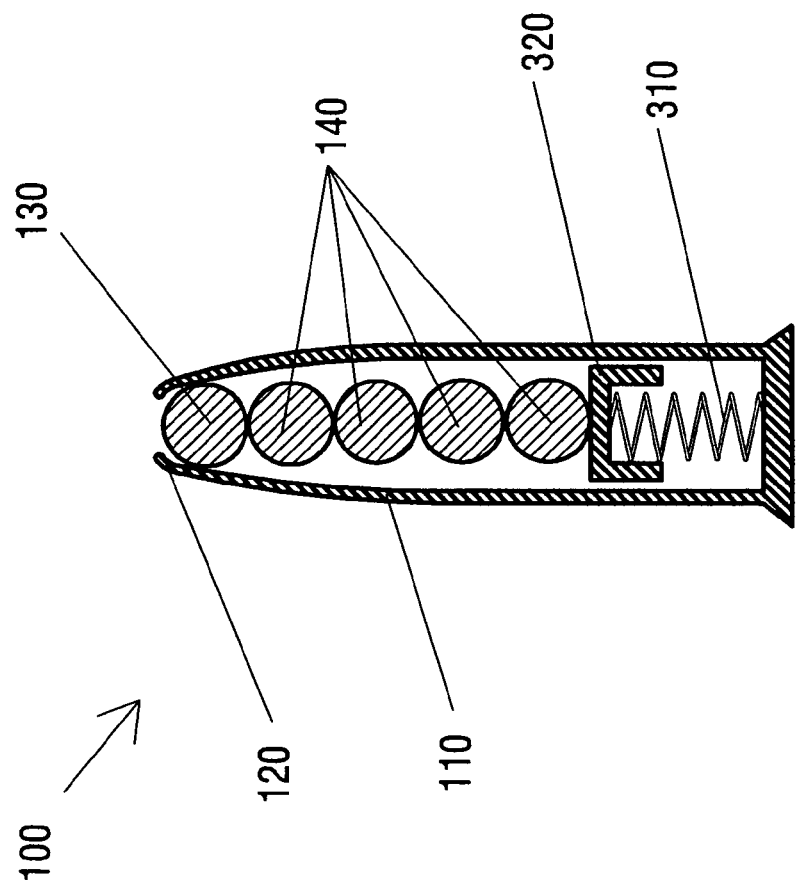

BATTERY-MAGAZINE

This application claims the benefit of priority of U.S. Provisional Application No. 61/149,971 filed on Feb. 4, 2009.

FIELD OF THE INVENTION

The present invention relates to the general technical field of devices for storing equipment, and more specifically to devices for storing batteries, particularly those devices being adapted to store batteries in an easily accessible manner which further enables easy separation of charged and discharged batteries.

FIELD OF THE INVENTION

The present invention relates generally to battery storage systems, and more particularly but not bay way of limitation to devices which are adapted to store both charged and discharged batteries in a separated configuration while enabling the easy retrieval or deposit of the batteries, and which enable the convenient transport of the storage device and the batteries it contains.

BACKGROUND

Batteries are necessary for the operation of a wide variety of personal electronics, flashlights, outdoor gear, work equipment, safety equipment, and any device that needs portable electrical power. Millions of batteries are in use in these types of devices. Batteries are capable of providing only a limited amount of power before they become discharged, and when they become discharged they need to be replaced. The storage and transportation of replacement batteries and the discharged batteries they replaced has long been a difficult proposition, with the cylindrical shape of most batteries presenting challenges to stacking, storage, organization, transportation, and usage.

Many unsatisfactory systems are currently in use for the storage of batteries. Batteries are commonly stored loose in drawers. This presents difficulties when it is necessary to find a battery, as many shapes and sizes may be mixed together. Furthermore, the batteries may roll into contact with the poles of other batteries, causing batteries to short out and presenting a fire hazard and the potential for chemical burns.

Individuals may tape the batteries together with duct tape or electrical tape to keep them from rolling at random, or rubber band them together in pairs. Colored rubber bands or tape may also be used to differentiate charged batteries from discharged batteries, for instance green rubber bands for charged batteries and red rubber bands for discharged batteries. While this prevents the rolling of the batteries and mitigates the hazard of shorting somewhat, it doesn't provide a significant improvement in the ability to find a battery of the correct size, and it requires a significant amount of effort to initially wrap the batteries, and then unwrap them for use. Furthermore, the use of tape typically leaves a sticky residue on the exterior of the batteries, and it is common for rubber bands to decay and split, leaving the batteries free to roll and mix at random.

Batteries may also be stored in paper boxes or fishing tackle boxes. While potentially an improvement for storage, and providing improved sorting capabilities, there are serious flaws as well. Paper boxes are often insufficiently strong and may burst, spilling the batteries. Furthermore, it is often difficult to retrieve the batteries from the boxes or the individual segments contained in the tackle boxes. Particularly for the smaller sizes such as AA and AAA, the batteries settle into closely fitted rows which make them difficult to extract. Additionally, the tackle box compartments are small, as are and many boxes which are currently used for batteries, and they may be poorly suited for individuals with larger fingers. Additionally, tackle boxes are relatively large, and do not allow for convenient transportation, and the typical weakness of paper boxes makes them unsuitable for transportation of more than a few batteries at a time.

It is apparent that there is a need for a system to insure the safe storage of batteries, preventing fires and chemical burns, while also enabling easy access to the batteries, enabling simple distinction between charged and discharged batteries, and which allows the battery storage containers to be transported safely and robustly in a wide variety of manners.

SUMMARY OF THE INVENTION

The present invention is directed to a safe, practical, efficient, easy-to-use system for the safe storage and convenient transport of conventional batteries in a durable container, providing a containment device which prevents battery shorts leading to fires or chemical burns while allowing easy access to the batteries, as well as providing the ability for the maintenance of a clear distinction between charged and discharged batteries.

Additionally, cylindrical batteries are maintained in a pole-oriented state, in which the positive pole of each battery is on the same side, making the loading of flashlights or other battery powered devices easy and straight forward even in low-light situations or the dark.

Furthermore, the battery magazine storage system can be produced at a minimal cost and is therefore suitable for use in selling packaged batteries or for use as a convenient means of transport for battery disposal or recycling.

Moreover, the battery magazine storage system can be adapted to include a charging system for rechargeable batteries which may be connected to any standard power source, or may include an integrated solar cell.

Additionally, since the device can be configured to include the separate storage of charged and discharged batteries in the same package, the likelihood of discharged batteries being retained and recycled appropriately is significantly increased. This reduces the chance that the discharged batteries might be left in a nearby trashcan, or worse left in the forest, mountains, lakes, or other natural environments by individuals who may be hunting, hiking, boating, or otherwise distant from trash receptacles.

Furthermore, the organized storage of the batteries, and the mechanics necessary to remove them from the battery magazine storage system provides child safety for the stored batteries, particularly in contrast to loose storage or storage in inappropriate boxes or containers.

An object of the present invention is to provide a battery storage devise that prevents battery shorts which can lead to fires or chemical burns.

A further object of the present invention is to provide a durable container that can be used in a variety of environments without breakage.

An additional object of the present invention is to provide a container that exhibits improved child safety characteristics.

Another object of the present invention is to provide a container that can be easily transported by individuals in a wide variety of ways.

An additional object of the present invention is to provide a container which can be configured to include the separate storage of both charged and discharged batteries, enhancing the ability of individuals to transport the discharged batteries to appropriate disposal sites.

A further object of the present invention is to provide a low cost container which can easily be sold along with batteries, and can be used as a container for discharged batteries as they are returned for recycling.

Another object of the present invention is to provide a battery storage container which can be configured to recharge the batteries it contains.

An additional object of the present invention is to provide a battery storage container which can be adapted to include a solar panel allowing the recharging of the contained batteries in remote areas.

A further object of the present invention is to provide a battery storage container in which the batteries can be maintained in a pole-oriented position, allowing the easy reloading of flashlights or other devices, even in dark or low-light situations.

These and other objects, features, and advantages of the present invention will become more readily apparent from the attached drawings and form the detailed description of the preferred embodiments, which follow.

BRIEF DESCRIPTION OF THE DRAWINGS

The preferred embodiments of the invention will hereinafter be described in conjunction with the appended drawings, provided to illustrate and not to limit the invention, where like designations denote like elements, and in which:

FIG. 3B is a sectional end view taken along the line 3B-3B of FIG. 3, showing a first embodiment of the present invention in which batteries are stored in a staggered column.

FIG. 4 is a side view showing a second embodiment of the present invention in which batteries are stored in a single column.

FIG. 4B is a sectional end view taken along the line 4B-4B of FIG. 4, showing a second embodiment of the present invention in which batteries are stored in a single column.

Like reference numerals refer to like parts throughout the several views of the drawings.

DETAILED DESCRIPTION OF THE INVENTION

Shown throughout the figures, the present invention is directed toward a safe, practical, efficient, and easy-to-use system for insuring the safe storage and convenient transport of conventional batteries in a durable and lightweight container. The battery magazine of the present invention can be configured for use with numerous common battery types. The battery magazine of the present invention utilizes principles developed to store bullets in conventional gun magazines to store batteries in an organized way which prevents short circuits and allows easy and intuitive storage and access.

Figure 1:
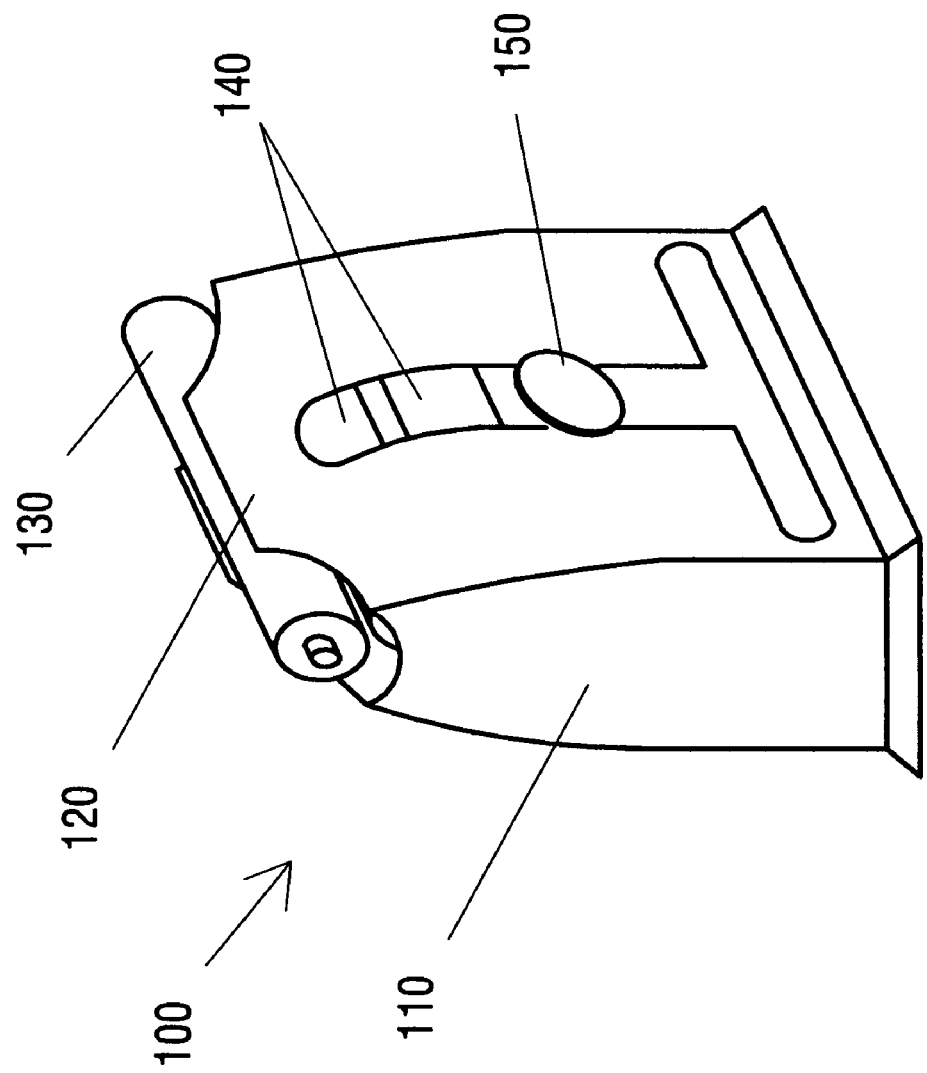
FIG. 1 is a perspective view showing a first embodiment of the present invention in which batteries are stored in a staggered column.

Referring now to FIG. 1, a battery magazine, shown generally as reference number 100 comprises a roughly rectangular storage casing 110 which is tapered toward the top. The uppermost portion of the storage casing 110 comprises retention lips 120 adapted to hold the batteries in place. The rectangular storage casing 110 is sized to hold two staggered columns of batteries at the base, but by tapering near the top allows a single ready battery 130 to be maintained at the apex of the battery magazine. The ready battery 130 is maintained at the apex of the battery magazine by the retention lips 120, and stored batteries 140 are maintained within the rectangular storage casing 110. A thumb lever 150 is provides which can serve to assist in the loading of the battery magazine.

The first embodiment of the battery magazine, utilizing a staggered column battery storage, is suitable for use with AAA and AA batteries, but can be used with other batteries as desired.

All embodiments of the battery magazine 100 can be provided in a number of different colors. Different colors can be used to indicate charged or discharged batteries. The battery magazine 100 is preferably formed of a transparent material, but if it is formed of an opaque material, a vertical slot can be provided from the top to close to the bottom to check the number of stored batteries 140 contained in the battery magazine 100. The battery magazine 100 can be formed of metal, plastic, or other materials, but is preferably constructed of lightweight organic plastics. A wide variety of plastics can be employed, if they have the proper physical properties of strength, resilience, toughness, as well as the preferred characteristic of transparency. Plastics such as polyester, polyamide, and polyolefin such as polyethylene or polypropylene can be used. The battery magazine 100 can also be constructed from a thermoplastic composition of nylon, glass fibers, and carbon black. Alternatively, the battery magazine 100 can be constructed from the glass fiber filled nylon sold by the DuPont Chemical Company under the trade name ZYTEL™.

Figure 2:
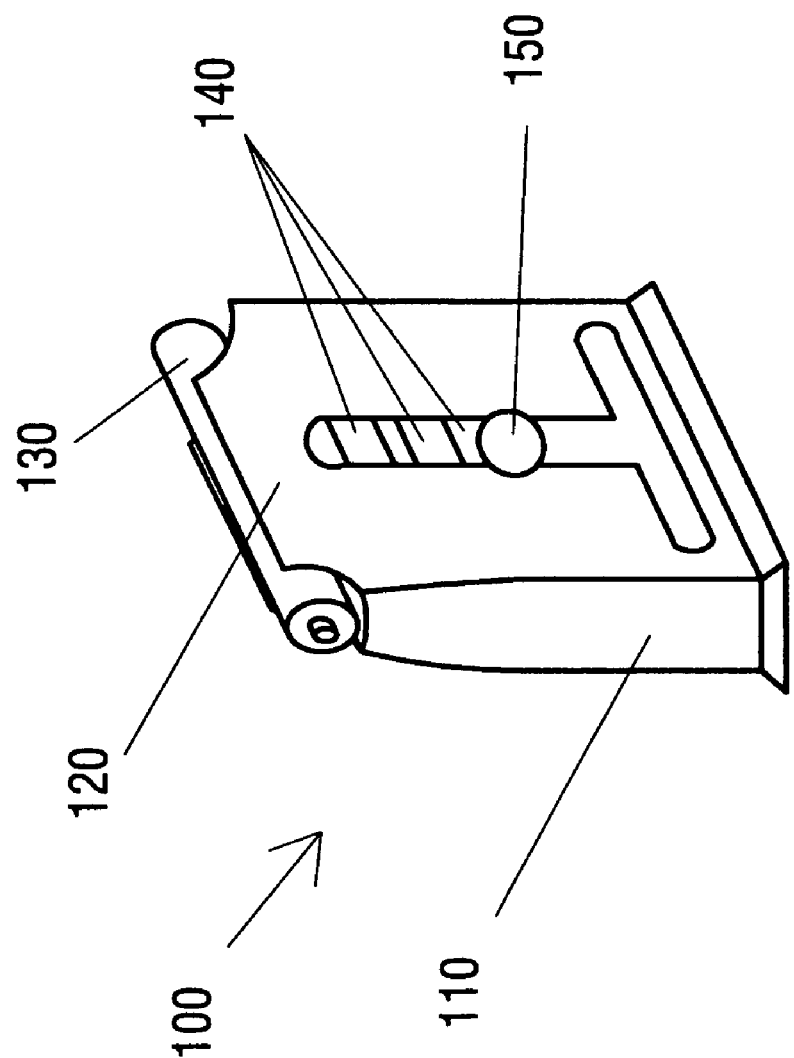
FIG. 2 is a perspective view showing a second embodiment of the present invention in which batteries are stored in a single column.

FIG. 2 depicts a second embodiment of the battery magazine 100. The rectangular storage casing 110 of the second embodiment of the battery magazine is sized to hold a single column of batteries. The rectangular storage casing 110 of the second embodiment does not taper as in the first embodiment, but maintains straight sides until forming retention lips 120 at the top. The retention lips 120 maintain a single ready battery 130 at the top of the battery magazine. Additional stored batteries 140 are contained within the rectangular storage casing 110. The second embodiment also includes a thumb lever 150, which can serve to assist in the loading of the battery magazine.

The second embodiment of the battery magazine utilizing a single column of batteries is more suitable for C or D cell batteries, due to their increased size and weight, but can be used with other battery sizes as desired.

Figure 3:
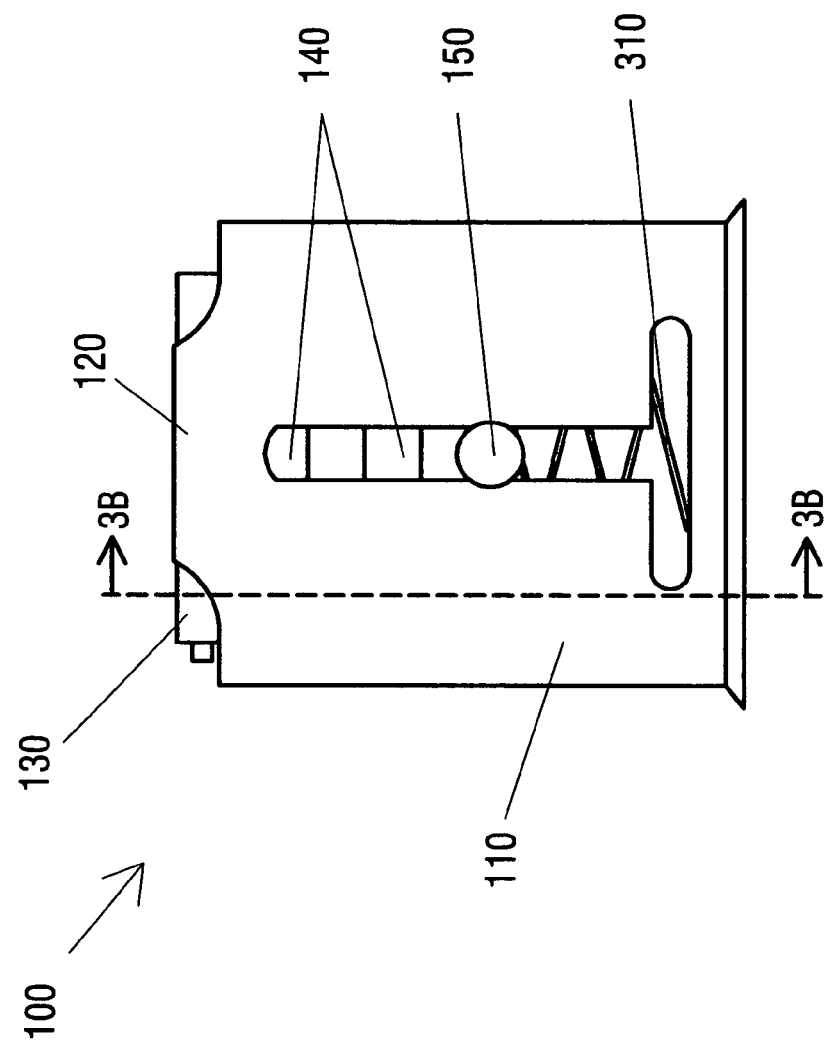
FIG. 3 is a side view showing a first embodiment of the present invention in which batteries are stored in a staggered column.

FIG. 3 shows a side view of the first embodiment of the battery magazine 100 of the present invention. A spring 310 is visible through a gap in the storage casing 110. The gap in the storage casing 110 allows the thumb lever 150 to slide up and down. The thumb lever 150 can be used to pre compress the spring 310, particularly with higher battery capacities, such as 10 or more, and serves to reduce the thumb and finger pressure against the spring tension of the spring 150 during the loading process.

FIG. 3B is a cut view of the first embodiment of the battery magazine 100 of the present invention along the cut line 3B in FIG. 3. The ready battery 130 is shown at the top of the stored batteries 120. The ready battery 130 and the stored batteries 120 are restrained from lateral movement by the rectangular storage casing 110. A base plate 220 is located below the batteries. The base plate 220 is pressed firmly up by the spring 310. The pressure of the base plate 220 on the stored batteries 120 maintains the ready battery 130 securely against the retention lips 120. The retention lips 120 prevent the ready battery 130 from falling out of the battery magazine 100.

In an alternative embodiment, the bottom of the storage casing 110 is removable attached, and can be removed to provide access to the internal compartment to allow cleaning of the interior of the battery magazine 100, or access to replace the string 310 or base plate 320.

FIG. 4 illustrates a side view of the second embodiment of the battery magazine 100 of the present invention. In the side view, the second embodiment of the battery magazine is similar to the first embodiment, differing primarily in the spacing of the stored batteries 120. A spring 310 is visible through a gap in the storage casing 110. The gap in the storage casing 110 allows the thumb lever 150 to slide up and down.

FIG. 4B is a cut view of the second embodiment of the battery magazine 100 of the present invention along the cut line 4B in FIG. 4. The ready battery 130 is shown at the top of the stored batteries 120. The ready battery 130 and the stored batteries 120 are restrained from lateral movement by the rectangular storage casing 110. A base plate 220 is located below the batteries. The base plate 220 is pressed firmly up by the spring 310. The pressure of the base plate 220 on the stored batteries 120 maintains the ready battery 130 securely against the retention lips 120. The retention lips 120 prevent the ready battery 130 from falling out of the battery magazine 100.

Figure 5:
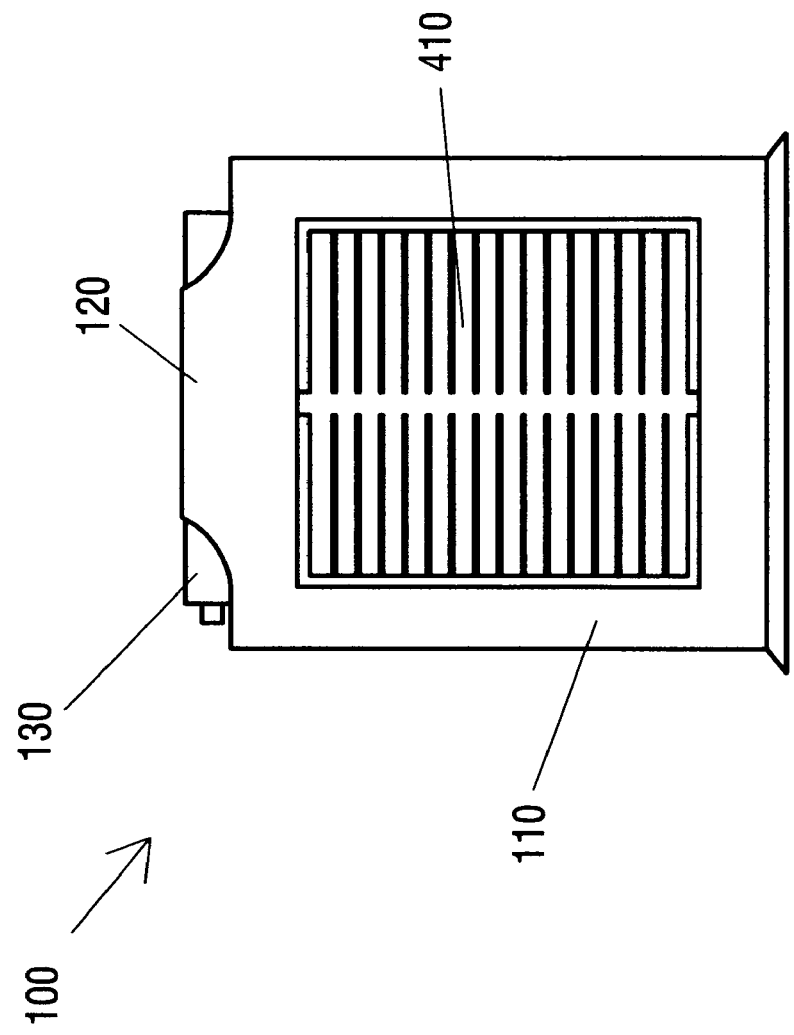
FIG. 5 is a side view showing a third embodiment of the present invention including a charging system for the stored batteries.

FIG. 5 depicts a third embodiment of the battery magazine 100 of the present invention. In this embodiment, a solar panel 410 is provided on the side of the battery magazine 100, which provides power to charge the stored batteries. Charging tracks (not shown) contact with the positive and negative poles of the stored batteries, and provide power to charge them.

In an alternative embodiment of the battery magazine 100 of the present invention, no solar panel is provided, but external electrical contacts are provides which can be attached to an external power source such as an AC/DC adaptor plugged into house current, a cigarette lighter receptacle from an automobile, a separate solar panel, or clips for attaching to the poles of any 12 volt wet-cell battery. An additional alternative embodiment provides a visual display of the charging action, charging progress, or change level by single or multiple light emitting devices.

Figure 6:
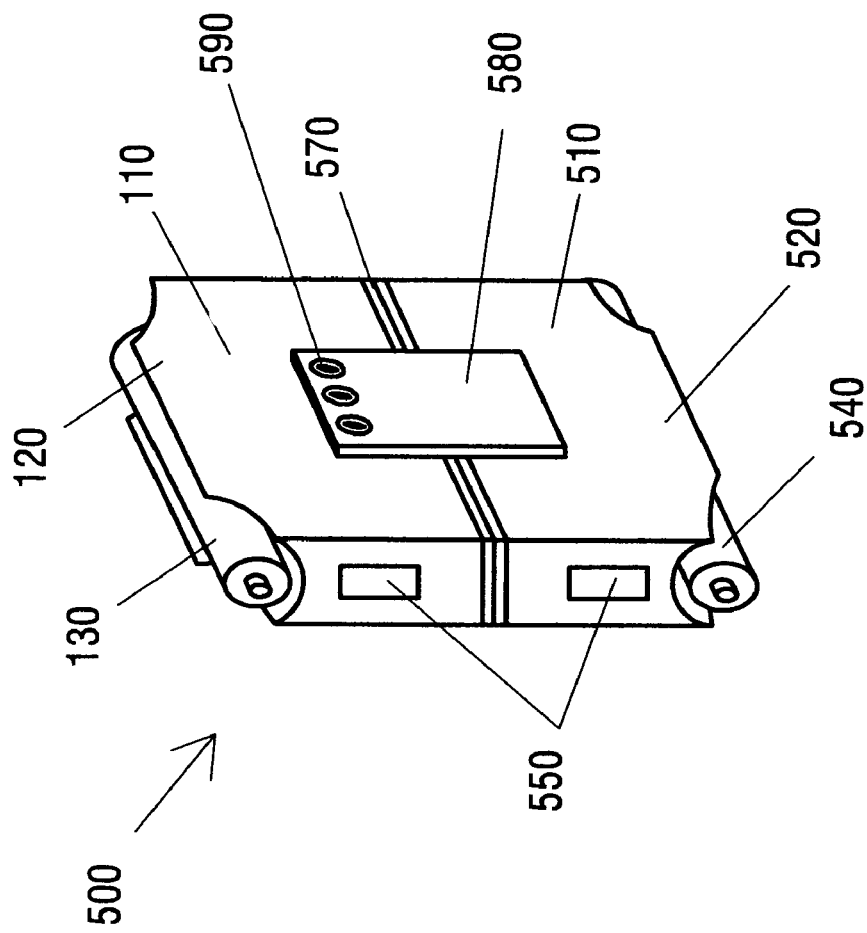
FIG. 6 is a perspective view of fourth embodiment of the present invention integrating two containers in an end-to-end configuration.

FIG. 6 shows a fourth embodiment of the present invention. In this embodiment, a paired battery magazine 500 is shown in which two battery magazines are connected with a magazine attachment 570. The battery magazines are constructed similarly to the battery magazine of the second embodiment, with a roughly rectangular upper storage casing 110 with upper retention lips 120 which prevent the upper ready battery 130 from falling out of the upper storage casing 110, and with a roughly rectangular lower storage casing 510 with lower retention lips 520 which prevent the lower ready battery 540 from falling out of the lower storage casing 510. Color-coded demarcations 550 can be used to distinguish the state of the batteries in sections of the paired battery magazine 550, for instance with a green demarcation indicating charged batteries and a red demarcation indicating discharged batteries. The color-coded demarcations 550 can alternatively comprise a mechanical slide or switch allowing the user to adjust the color-coding. In an alternative embodiment in which the battery magazine 100 is made of plastic, a dye can be applied to the plastic during the manufacturing process, causing the battery magazine 100 to be a variety of colors as desired.

This fourth embodiment of the present invention further includes a belt attachment 580, which can be belt-loop, hook-and-loop fastener, or other device, but is shown as a belt-clip, which is attached to the upper battery magazine 100 by a set of rivets 590.

The magazine attachment 570 can be clips, hook-and-loop fasteners, straps, slots, grooves which allow the magazines to slide together, or other devices.

In an alternative embodiment, the magazine attachment can be arranged to allow multiple battery magazines to be connected side-by-side, rather than in the bottom-to-bottom configuration illustrated in FIG. 6.

The battery magazine of the present invention can be configured or adapted in a number of additional ways. The size of the battery magazine 100 can vary for use with AAA, AA, C, and D cells. It can also be used with rectangular batteries such as standard 9 volt batteries and others, or can be adapted for use with flat, disk shaped batteries such as mercury cells for calculators, hear aids, or others. It is suitable for use with batteries of any DC charge.

In an alternative embodiment, the battery magazine can further be adapted to allow the storage of more batteries by being formed in a curved, cylindrical shape, such as a rotary or drum magazine, with a handle for ease of carrying.

In an additional alternative embodiment, the battery magazine can be formed as a helical magazine with a handle for ease of carrying. In this additional alternative embodiment, the batteries would follow a spiral path, allowing, for a larger capacity of batteries. The embodiments of the battery magazine invention with larger capacities would be useful for the storage of large number of batteries would be useful to larger groups, and for use in military or police operations, by the Red Cross or schools, or in outdoor events or other situations.

From the foregoing, it will be apparent that the battery magazine of the current invention provides a battery storage system that is safe, convenient to use, and can be configured for use with a wide variety of batteries.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A battery magazine for storing dry-cell batteries comprising:
    a housing having a storage casing defining at least in part a container with a top end, a bottom end, and an opening at the top end, the container configured to store a sequential array of dry-cell batteries, and the opening configured for loading batteries and unloading batteries;
    a base plate configured to move up and down in the container; and
    a spring provided between the base plate and the bottom end of the container configured to urge the base plate toward the opening.

2. A battery magazine as defined in claim 1 in which the container is configured to store a sequential array of dry-cell batteries in a single column.

3. A battery magazine as defined in claim 1 in which the container is configured to store a sequential array of dry-cell batteries in a pair of staggered columns.

4. A battery magazine as defined in claim 1 in which said storage casing is made of metal.

5. A battery magazine as defined in claim 1 in which said storage casing is made of plastic.

6. A battery magazine as defined in claim 5 in which said storage casing is made of a lightweight organic plastic.

7. A battery magazine as defined in claim 1 further comprising a thumb lever attached to said base plate wherein said thumb lever extends to the outside of said container.

8. A battery magazine as defined in claim 1 further comprising:
first charging tracks along the insides of the container positioned to contact the positive poles of a sequential array of batteries stored in the container on a first side; and
second charging tracks along the inside of the container positioned to contact the negative poles of a sequential array of batteries stored in the container on a second side; wherein said second side is opposite said first side.

9. A battery magazine as defined in claim 8 further comprising external connections configured to supply power to the first charging tracks and the second charging tracks.

10. A battery magazine as defined in claim 9 wherein said external connection comprises a connection to an AC/DC adapter.

11. A battery magazine as defined in claim 8 wherein said external connection comprises a connection to a cigarette lighter receptacle.

12. A battery magazine as defined in claim 8 wherein said external connection comprises a connection to a solar panel.

13. A battery magazine as defined in claim 12 wherein said solar panel is attached to said container.

14. A battery magazine as defined in claim 1 in which said container is roughly rectangular.

15. A battery magazine as defined in claim 1 in which said container is drum shaped.

16. A battery magazine as defined in claim 1 in which said container is helical in shape.

17. A battery magazine as defined in claim 1 further comprising a belt attachment.

18. A battery magazine as defined in claim 17 in which said belt attachment comprises a belt-clip.

19. A battery magazine as defined in claim 17 in which said belt attachment comprises a belt-loop.

20. A battery magazine as defined in claim 17 in which said belt attachment comprises a hook-and-loop fastener.

21. A battery magazine as defined in claim 1 in which the bottom of said storage casing is removably attached.

22. A battery magazine as defined in claim 1 further comprising a magazine attachment configured to attach two battery magazines together.

23. A battery magazine as defined in claim 22 wherein said magazine attachment is configured to attach two battery magazines together in a bottom-to-bottom configuration.

24. A battery magazine as defined in claim 22 wherein said magazine attachment is configured to attach two battery magazines together in a side-by-side configuration.

25. A battery magazine as defined in claim 1 further comprising color-coded demarcations.

26. A battery magazine as defined in claim 25 in which said battery magazine if is formed of plastic and in which said color-coded demarcations comprise a dye applied to the plastic before the manufacture of the battery magazine.

27. A battery magazine as defined in claim 25 in which said color-coded demarcations are mechanical switches configured to allow the selection of multiple colors.

\* \* \* \* \*